United States Patent
Kincaid

(12) 
(10) Patent No.: US 6,247,024 B1
(45) Date of Patent: Jun. 12, 2001

(54) METHOD AND SYSTEM FOR PERFORMING DEFERRED FILE REMOVAL IN A FILE SYSTEM

(75) Inventor: W. James Kincaid, Pebble Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/161,061

(22) Filed: Sep. 25, 1998

(51) Int. Cl.$^7$ .................................................. G06F 12/00
(52) U.S. Cl. ..................... 707/204; 707/100; 707/205; 711/162; 711/170; 711/202
(58) Field of Search ................................. 707/100, 202, 707/203, 205, 206; 709/219, 229; 711/112, 170, 159, 162, 202, 203, 206, 207, 208

(56) References Cited

U.S. PATENT DOCUMENTS

| | | | |
|---|---|---|---|
| 4,481,606 | 11/1984 | Nozawa et al. | 364/900 |
| 4,761,737 | 8/1988 | Duvall et al. | 364/300 |
| 4,945,474 | 7/1990 | Elliott | 364/200 |
| 5,155,835 | * 10/1992 | Belsan | 395/425 |
| 5,222,217 | * 6/1993 | Blount et al. | 395/325 |
| 5,297,278 | 3/1994 | Wang et al. | 395/600 |
| 5,345,575 | * 9/1994 | English et al. | 395/425 |
| 5,410,667 | * 4/1995 | Belsan et al. | 395/425 |
| 5,479,655 | 12/1995 | Iwamoto et al. | 395/600 |
| 5,511,177 | 4/1996 | Kagimasa et al. | 395/441 |
| 5,530,850 | 6/1996 | Ford et al. | 395/600 |
| 5,555,388 | 9/1996 | Shaughnessy | 395/427 |
| 5,559,957 | 9/1996 | Balk | 395/182.21 |
| 5,592,669 | 1/1997 | Robinson et al. | 395/622 |
| 5,604,900 | 2/1997 | Iwamoto et al. | 395/621 |
| 5,642,501 | 6/1997 | Doshi et al. | 395/608 |
| 5,644,698 | 7/1997 | Cannon | 395/182.04 |
| 5,668,958 | 9/1997 | Bendert et al. | 395/308 |
| 5,692,178 | 11/1997 | Shaughnessy | 395/477 |
| 5,721,907 | 2/1998 | Pyne | 395/610 |

(List continued on next page.)

FOREIGN PATENT DOCUMENTS

745939A2  12/1996  (EP) ................................ G06F/11/14

OTHER PUBLICATIONS

"Method to Ensure the Integrity of File Operations in a Database Transaction," *IBM Technical Disclosure Bulletin* vol. 38, No. 7, Jul. 1995, 475–477.

Primary Examiner—Thomas Black
Assistant Examiner—Jacques Veillard
(74) Attorney, Agent, or Firm—Sawyer Law Group LLP; Noreen A. Krall

(57) ABSTRACT

A system and method for removing a file from a system is disclosed. The system includes a storage device and a virtual storage. The file has associated metadata that indicates a location of the file on the storage device. A first copy of the associated metadata resides on the virtual storage. A second copy of the associated metadata resides on the storage device. The system and method include marking the file as removed and updating the second copy of the associated metadata substantially immediately if the system is to run out of space on the storage device and a next scheduled update of the second copy of the associated metadata has not occurred. The system and method further include indicating that the location is available for storing data substantially immediately if the system is to run out of space on the storage device and the next scheduled update has not occurred. In one aspect, the system and method also include updating the second copy of the associated metadata during the next scheduled update if the system is not to run out of space before the next scheduled update. In this aspect, the system and method also include indicating that the location is available for storing data during the next scheduled update if the system is not to run out of space before the next scheduled update.

19 Claims, 6 Drawing Sheets

U.S. PATENT DOCUMENTS

| | | | |
|---|---|---|---|
| 5,721,916 | 2/1998 | Pardikar | 395/617 |
| 5,727,206 | 3/1998 | Fish et al. | 395/618 |
| 5,734,894 | 3/1998 | Adamson et al. | 395/616 |
| 5,742,818 | 4/1998 | Shoroff et al. | 395/616 |
| 5,745,749 | 4/1998 | Onodera | 395/612 |
| 5,787,445 * | 7/1998 | Daberko | 707/205 |
| 5,819,296 * | 10/1998 | Anderson et al. | 707/204 |
| 6,038,639 * | 3/2000 | O'Brien et al. | 711/114 |

* cited by examiner

METHOD AND SYSTEM FOR PERFORMING DEFERRED FILE REMOVAL IN A FILE SYSTEM

FIELD OF THE INVENTION

The present invention relates to removal of files from a file system and more particularly to a method and system for deferring removal of files without data integrity exposures.

BACKGROUND OF THE INVENTION

Conventional computer files systems are used to create, edit, and store files. Typically, such conventional computer systems include a virtual storage or memory and a storage device, such as a disk. In order to access the files created, such conventional computer systems associate metadata with each file. The metadata for the file indicates the physical location of the file on the disk. For example, the metadata typically includes a map indicating the blocks on the disk in which the file is stored. The metadata may also indicate other attributes of the file and may be used for other purposes. During operation, the conventional system typically keeps a copy of a portion of the file and its metadata in the virtual storage in order to have fast access to the file when performing operations on the file.

When operations are performed on the files, the metadata associated with the files should also be updated on the storage device. For example, if additional information is written to the file or some information is deleted from the file the metadata on the disk should be updated to indicate that the file is stored on different blocks on the disk. However, updating the metadata stored on the disk may be very slow. This is because accessing the disk may be much more time consuming than accessing the virtual storage. Consequently, the metadata typically is changed only in virtual storage when the operation is performed. The changes to metadata are saved to disk, or hardened, at predetermined intervals. As a result, the metadata on the disk may be periodically updated without substantially slowing the performance of the conventional system.

When a file is removed, or deleted, several operations are typically performed. As with other operations, the metadata associated with a file is updated after removal of the file. In addition, the location on the disk where the file was stored are freed. This allows other data to be stored in the locations. Moreover, a directory which lists the file is updated to delete the file from the directory.

In one conventional computer system, updating metadata for removal of a file is treated the same as for other operations. Changes to the directory are treated in the same manner as changes to the metadata. Thus, the metadata for the removed file is changed in virtual storage and these changes in the metadata hardened to disk at the next predetermined interval. Similarly, the directory in virtual storage is rewritten without the removed file and these changes hardened to disk at the next predetermined interval. However, the locations in which the removed file was stored are freed immediately. In certain operating systems, such as UNIX, this is done because the operating systems require that locations for a removed file be immediately available for use by another data file. As a result, additional time is not taken to access the disk when the file is removed and the locations for the removed file can be used to store another file.

Although this conventional system functions in most cases, data integrity exposures may occur. A data exposure occurs when data for a file is inadvertently made accessible through a different file. It is possible to create a new file before the changes to the metadata for the removed file are hardened to disk. Because the locations in which the removed file was stored were freed upon removal, the new file could be written to those locations. The system may crash after the new file is written to these locations but before the changes to the metadata and the directory are hardened to disk. When the system is rebooted, the new file is written in the locations on the disk. However, because the changes to the metadata for the removed file were not hardened to disk, the metadata for the removed file will be present. This metadata indicates that data for the removed file can be found in the same locations, which now hold data for the new file. Because the metadata for the removed file was not changed, the data for the new file can be accessed by accessing the removed file. A data integrity exposure has, therefore, occurred. This is considered an illegal situation by certain operating systems, such as UNIX, and can result in undesirable occurrences. For example, users who are authorized to access the removed file but not the new file can view and edit the data for the new file residing in the locations.

Another conventional system prevents data integrity exposures by treating a removal of a file differently from other operations. Such conventional systems immediately harden changes to the metadata for a removed file. Thus, the data integrity exposure does not occur.

However, because each metadata is hardened for each removal, performance of the system suffers. For each removal, the disk is accessed to update the metadata for the removed file. As a result, performance of the system is slowed. This reduction in performance is particularly large when multiple files are removed concurrently. Multiple files may be removed by certain user-initiated commands or when an application clears a cache or temporary files. For each file removed, the disk is accessed to update the metadata. Consequently, as the number of files being removed grows, the loss in performance grows.

Accordingly, what is needed is a system and method for removing data files without data integrity exposures and without drastic reductions in performance. The present invention addresses such a need.

SUMMARY OF THE INVENTION

The present invention provides a method and system for removing a file from a system. The system includes a storage device and a virtual storage. The file has associated metadata that indicates a location of the file on the storage device. A first copy of the associated metadata resides on the virtual storage. A second copy of the associated metadata resides on the storage device. The system and method comprise marking the file as removed and updating the second copy of the associated metadata substantially immediately if the system is to run out of space on the storage device and a next scheduled update of the second copy of the associated metadata has not occurred. The system and method further comprise indicating that the location is available for storing data substantially immediately if the system is to run out of space on the storage device and the next scheduled update has not occurred. In one aspect, the system and method also comprise updating the second copy of the associated metadata during the next scheduled update if the system is not to run out of space before the next scheduled update. In this aspect, the system and method also comprise indicating that the location is available for storing data during the next scheduled update if the system is not to run out of space before the next scheduled update.

According to the system and method disclosed herein, the present invention can defer updating metadata associated with a file that is removed without data integrity exposures, thereby increasing overall system performance.

DETAILED DESCRIPTION OF THE INVENTION

The present invention relates to an improvement in removal of files on a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
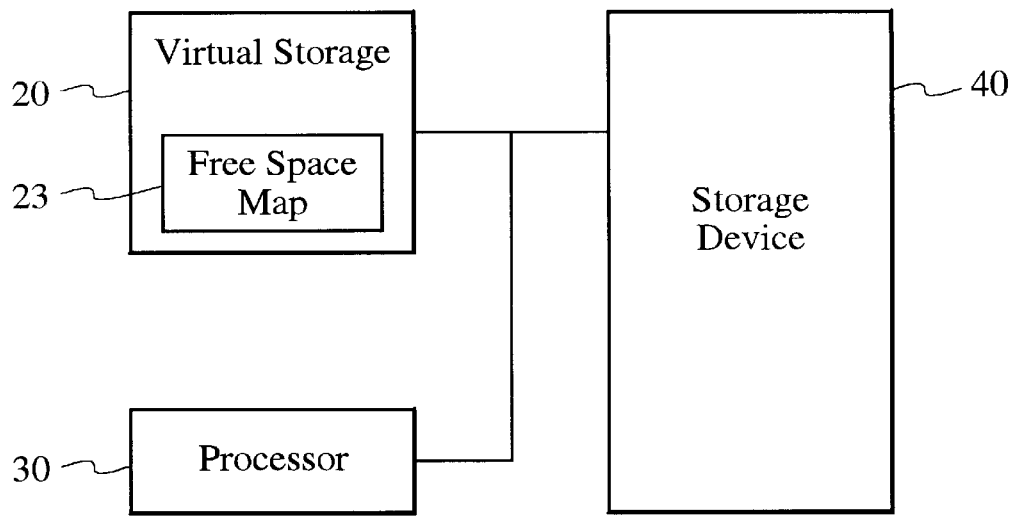
FIG. 1A is a block diagram of a conventional computer system.

FIG. 1A is a block diagram of a computer system 10 capable of storing files. The computer system 10 includes a virtual storage 20 or memory, a processor 30, and a storage device 40, such as a disk. The virtual storage 20 may include a copy of a free space map 23. The free space map 23 indicates locations (not shown) on the disk 40 which are free and can be used to store data. The virtual storage 20 also includes a copy of the metadata (not shown). The disk 40 also typically includes a copy of the metadata (not shown) and a copy of the free space map 23. The virtual storage 20 can be more quickly accessed than the disk 40 and, therefore, may be used to temporarily store and perform operations on a copy of the information residing on the disk 40. Typically, the information stored on the disk 40 is periodically updated in order to synchronize the information on the disk 40 with the information stored in the virtual storage 20. In certain conventional systems, such as a UNIX system, this function is provided by a sync daemon which automatically runs at particular intervals.

Figure 1B:
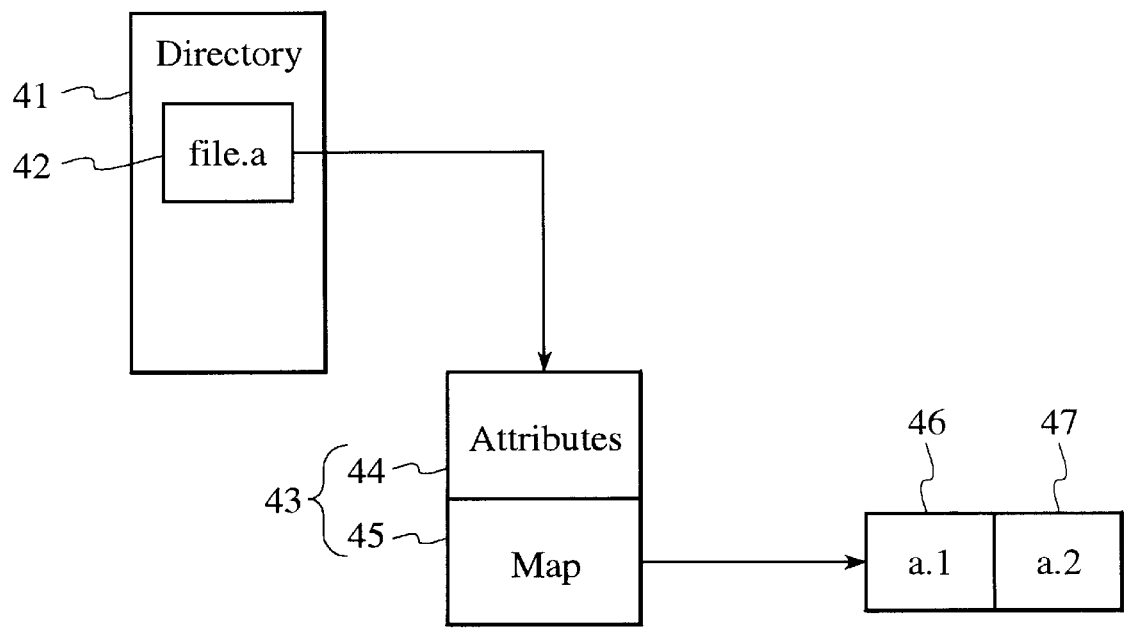
FIG. 1B is a block diagram of the relationship between a conventional directory, metadata, and storage device for a stored file.

FIG. 1B is a block diagram of portions of the computer system 10 and is used to illustrate the relationship between a file, a directory 41, and metadata 43 associated with the file. The directory 41 includes a list of all files considered to be within the directory. Thus, the directory 41 is shown as including the entry 42 for a particular file, called file.a. The entry 42 for file.a in the directory 41 provides a pointer to the metadata 43 associated with the file.a. The metadata 43 includes attributes 44 of the file as well as a map 45 for the file. The attributes 44 may include the users allowed to access the file.a, the time of the latest alterations made to the file.a, or other information. The map 45 for the file indicates the physical locations 46 and 47 on the disk 40 in which data for the file is stored. For example, the locations 46 and 47 may be blocks or pages on the disk 40. Using the metadata 43, and the entry 42 in the directory for the file.a, the system 10 can find and perform operations on the data for file.a stored in locations 46 and 47.

Figure 2A:
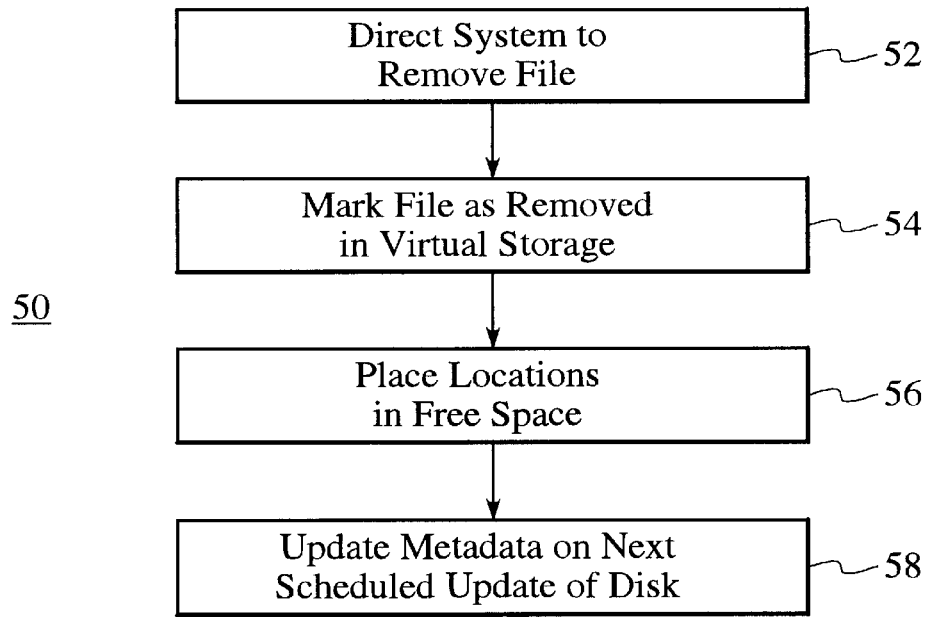
FIG. 2A is a flow chart depicting one conventional method for removing a file.

FIG. 2A depicts a conventional method 50 for removing one or more files from the system 10. FIG. 2 will be discussed in the context of removing the file.a from the system 10. The method 50 may be used in a system 10 which uses a UNIX operating system. The system 10 is directed to remove the file.a, via step 52. The file.a is then marked as removed in virtual storage 20, via step 54. Typically, the metadata 43 and file in the virtual storage 20 are updated in step 54. However, the changes to the metadata 43 are not immediately saved, or hardened, to the disk 40. This is because the time required to access the disk 40 is typically much greater than the time required to access the virtual storage 20. The locations 46 and 47 are placed in the copy of the free space map 23 residing on the virtual storage 20, via step 56. Consequently, the locations 46 and 47 are available to store data for another file shortly after the file.a is removed. The changes in the metadata for the removed file are then hardened to the disk 40 at the next scheduled update of the disk 40, via step 58. Typically, the changes to the metadata are hardened to disk when the virtual storage 20 and the disk 40 are next synchronized. This typically occurs the next time the sync daemon (not shown) runs. Typically, step 58 includes removing the entry 42 for file.a from the directory 41 and removing the map 45 for the file.a in the metadata 43 stored on the disk 40. Typically, step 58 also includes hardening the changes to the free space map 23 to the disk 40.

Although the method 50 makes the locations 46 and 47 of the removed file.a available shortly after the removal of file.a, one of ordinary skill in the art will readily realize that data integrity exposures may occur. A user or another process (not shown) may create a new file or add data to an existing file between steps 56 and 58. Typically, data is written to the disk 40 prior to metadata being updated. In addition, the next available locations listed in the free space map 23 are selected for storing the data. The next available locations listed in the free space map 23 may be the locations 46 and 47 in the disk 40. Thus, the locations 46 and 47 may be selected to store data for another file, file.b. The system may also crash after data for file.b is written to the locations 46 and 47, but before the changes to the metadata 43 for the file.a and file.b are hardened to the disk 40.

Figure 2B:
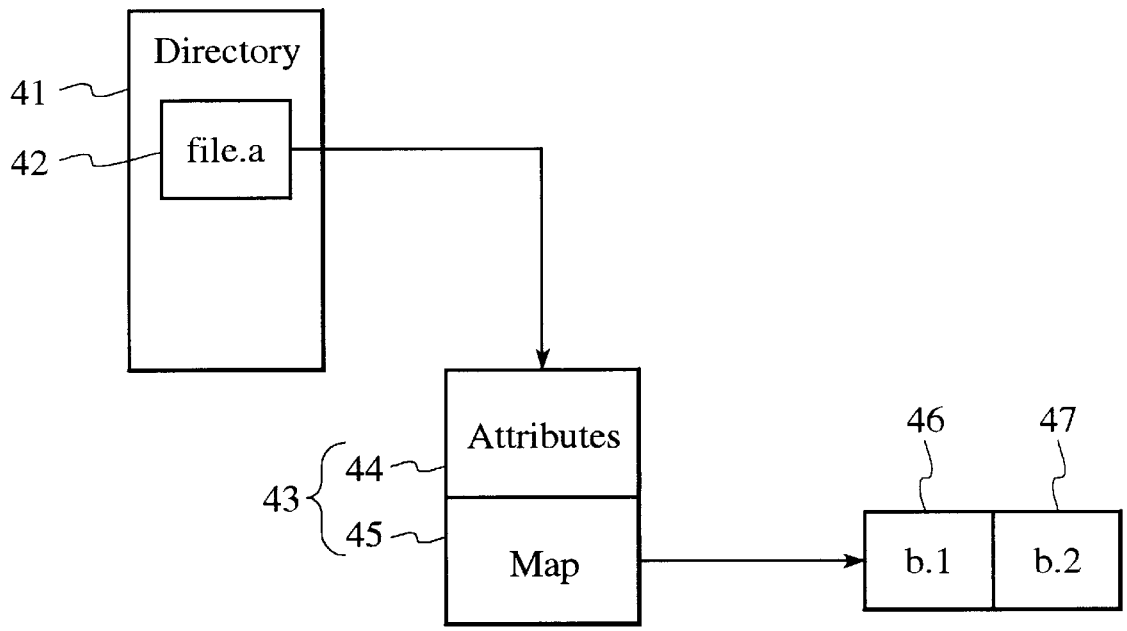
FIG. 2B is a block diagram of a possible relationship between a conventional directory, metadata, and storage device due to a data integrity exposure.

FIG. 2B depicts the relationship between a directory, metadata, and storage device 40 when the system 10 is rebooted after a failure similar to the one discussed above. Upon rebooting of the system 10, the information hardened to the disk 40 survives. Thus, data for file.b will be written in locations 46 and 47. However, because changes to the metadata 43 for the file.a were not hardened to the disk 40, the metadata 43 for the file.a remains as it was prior to removal of the file.a. Because the metadata for the file.b was not hardened, metadata for the file.b is not present. Thus, the directory 41 contains an entry 42 including the name of the file.a, but not for the file.b. The entry 42 points to the metadata 43. The map 45 in the metadata 43 points to the locations 46 and 47 in which data for file.a was stored prior to removal of file.a. However, data for file.b has been written to locations 46 and 47. Thus, data for file.b is accessible through file.a. Consequently, a data integrity exposure has occurred. A data integrity exposure is considered an illegal condition for operating systems such as UNIX. Because of the data integrity exposure, several problems can occur. For example, a user not authorized to view or edit the file.b may have access to the data for file.b via the metadata for file.a.

Figure 3:
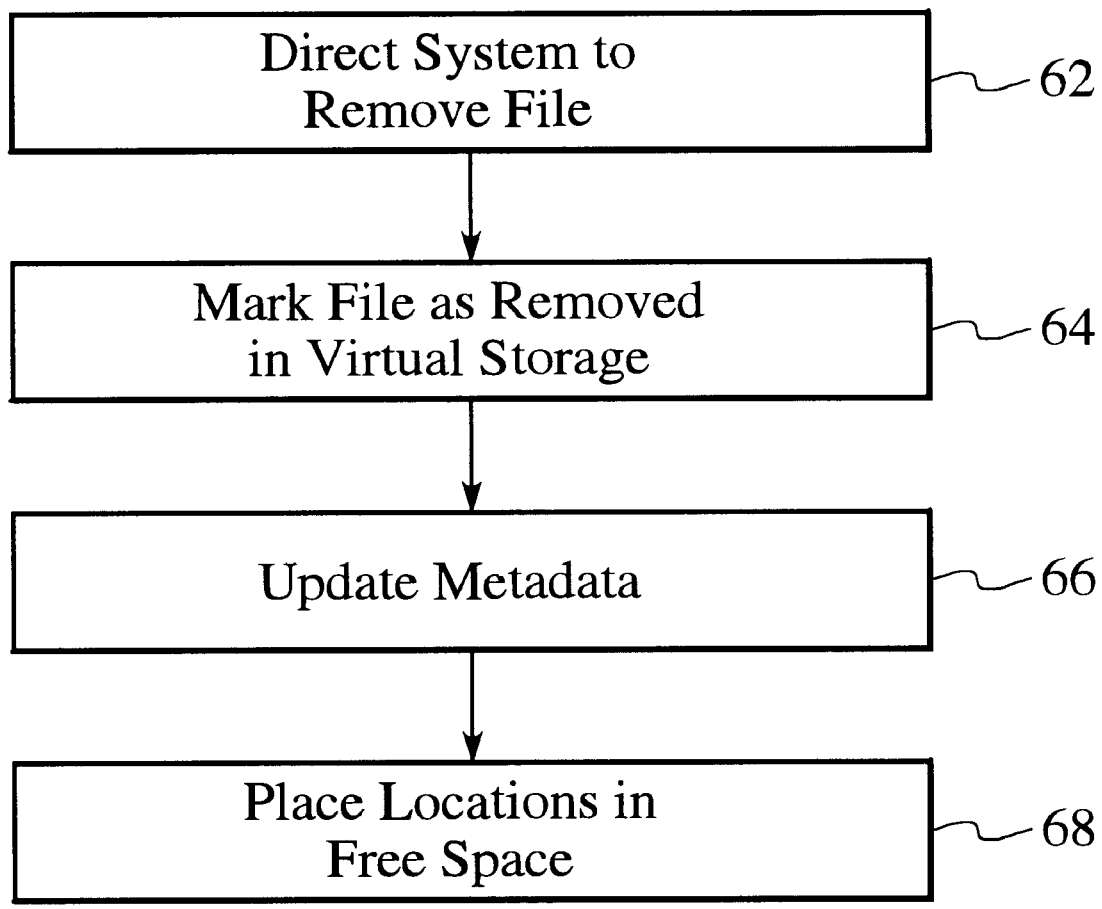
FIG. 3 is a flow chart depicting a second conventional method for removing a file.

FIG. 3 depicts another conventional method 60 for removing a file, such as the file.a. FIG. 3 will be discussed in the context of removing the file.a from the system 10. The method 60 may be used in a system 10 which uses a UNIX operating system. The system 10 is directed to remove the file.a, via step 62. The file.a is then marked as removed in virtual storage 20, via step 64. Therefore, the file and metadata may be removed from the virtual storage 20 in step 64. The changes to the metadata 43 are then immediately hardened to the disk 40, via step 66. Typically, step 66 includes removing the entry 42 for file.a from the directory 41 and removing the map 45 for the file.a in the metadata 43 stored on the disk 40. The locations 46 and 47 are also placed in the free space map 23, via step 68.

Although the method 60 shown in FIG. 3 does not suffer from data integrity exposures, those with ordinary skill in the art will realize that the method 60 is relatively slow. Each time a file is removed, the disk 40 is accessed to immediately change the metadata 43. This is in addition, to scheduled updates performed by the system 10. Thus, disk 40 is accessed more often and the performance of the system 10 degraded.

One of ordinary skill in the art will also realize that the degradation in system 10 performance is increased when multiple files are removed. For example, a UNIX operating system allows for a single command, called a recursive remove, which will remove all files in a directory. The recursive remove typically functions by calling the method 60 for each file removed. For each file, the disk 40 is accessed to update the metadata 43 and to rewrite the directory 41 to exclude the file. Consequently, multiple disk 40 accesses are performed for each file being removed. Thus, the slowdown in performance is significantly greater than for removal of a single file.

The present invention provides for a method and system for removing a file from a system. The system includes a storage device. The file has associated metadata that indicates a location of the file on the storage device. The system and method comprise marking the file as removed and updating the metadata on the storage device substantially immediately if the system is to run out of space on the storage device and a next scheduled update of the metadata on the storage device has not occurred. The system and method further comprise indicating that the location is available for storing data substantially immediately if the system is to run out of space on the storage device and the next scheduled update has not occurred. In one aspect, the system and method also comprise updating the metadata on the storage device during the next scheduled update if the system is not to run out of space before the next scheduled update. In this aspect, the system and method also comprise indicating that the location is available for storing data during the next scheduled update if the system is not to run out of space before the next scheduled update.

Because the metadata is not always updated to the storage device immediately, performance of a system in accordance with the present invention is not slowed unduly. When a large number of files is removed in a system in accordance with the present invention, the improvement in performance is even more noticeable because many accesses of the storage device may be avoided. In addition, because the metadata is updated if the system in accordance with the present invention is to run out of space, data integrity exposures can be avoided. Thus, performance is improved while illegal conditions may be avoided.

The present invention will be described in terms of a UNIX operating system which is being used to store two files of the same size. However, one of ordinary skill in the art will readily recognize that this method and system will operate effectively for other types of operating systems and other numbers of files having different sizes. In addition, the present invention will primarily be described in the context of the removal of a single file occupying two blocks. However, the present invention is consistent with the removal of multiple files having another number of blocks by a single command. In one context, the present invention finds particular utility where large numbers of files are removed. The present invention is also described in the context of and preferably utilized in a system using virtual storage. However, nothing prevents the present invention from use in a system having a memory and which does not use virtual storage.

Figure 4:
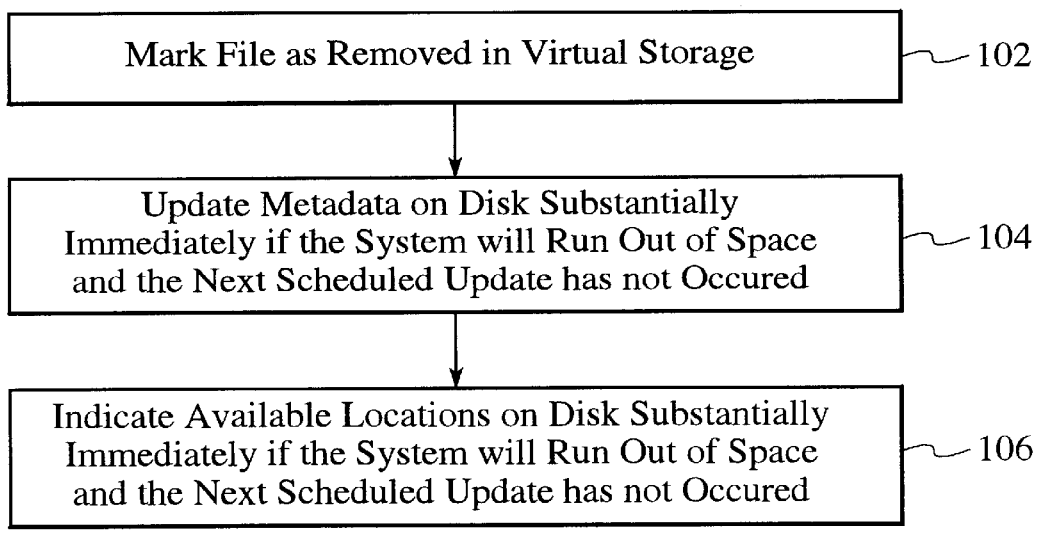
FIG. 4 is a flow chart depicting one embodiment of a method for removing files in accordance with the present invention.

To more particularly illustrate the method and system in accordance with the present invention, refer now to FIG. 4 depicting a flow chart of one embodiment of a method 100 in accordance with the present invention. The method 100 is used in conjunction with a computer system, such as the system 10, which is used to create, edit, and store files. The method 100 commences after the system 10 has received a command or commands to remove a file or files. The command may come from a user or software executing on the system 10.

The file to be removed, such as file.a, is marked in virtual storage 20 as removed, via step 102. Thus, data for the file to be removed may be deleted from the virtual storage 20, the metadata 43 for the file updated in the virtual storage 20, and the file listed as removed in the virtual storage 20. However, the metadata 43 for the removed file on the disk 40 is not immediately updated. Instead, via step 104, the metadata 43 is updated substantially immediately if the system 10 will run out of space on the disk 40 and the next scheduled update of the metadata 43 on the disk 40 has not occurred. It is indicated, for example in the virtual storage 20, that locations on the disk 40 which stored the removed file are available to store data substantially immediately if the system 10 will run out of space on the disk 40 and the next scheduled update of the metadata 43 on the disk 40 has not occurred, via step 106.

Figure 5:
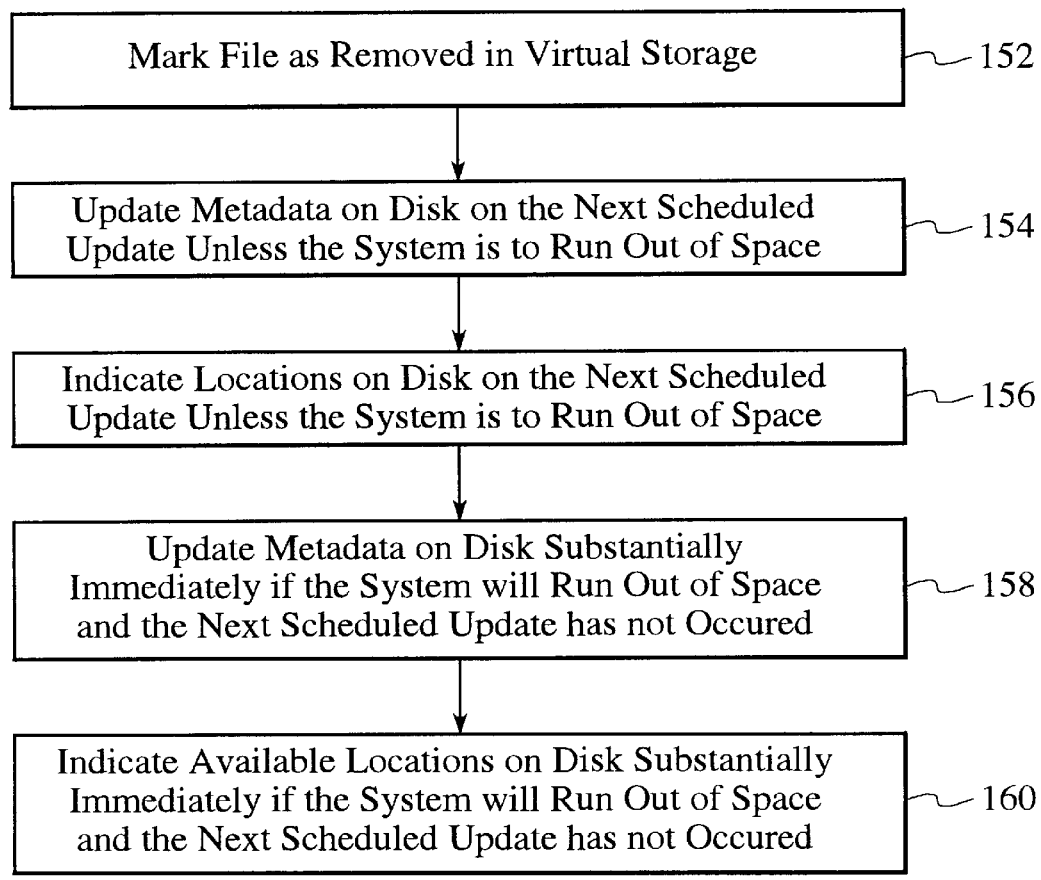
FIG. 5 is a more detailed flow chart depicting one embodiment of a method in accordance with the present invention.

FIG. 5 depicts a more detailed flow chart of a method 150 in accordance with the present invention. The method 150 is used in conjunction with a computer system, such as the system 10, which is used to create, edit, and store files. The method 150 commences after the system 10 has received a command or commands to remove a file or files. The command may come from a user or software executing on the system 10.

The file to be removed, such as file.a, is marked in the virtual storage 20 as removed, via step 152. Thus, the file listed as removed in the virtual storage 20, the metadata 43 for the file updated in the virtual storage 20, and any data for removed file may be deleted from the virtual storage 20. However, the metadata 43 for the removed file on the disk 40 is not immediately updated. Instead, the update of the metadata 43 for the removed file on the disk 40 will be updated at the next scheduled update, via step 154. In addition, the locations in which the removed file was stored will be marked as free for storing data at the next scheduled update, via step 156. In one embodiment, step 156 includes updating the free space map 23 in the virtual storage 20 and hardening the changes in the free space map 23 to the disk 40. In one embodiment, steps 154 and 156 are performed the next time that a sync daemon (not shown) synchronizing the virtual storage 20 and disk 40 runs. In a preferred embodiment, both the changes in the metadata 43 and the changes to the free space map 23 are hardened to the disk 40 together. Thus, in a preferred embodiment, either the changes to the metadata 43 and the changes to the free space map 23 are both hardened to the disk 40 together or neither of the changes are hardened to the disk 40.

However, a file may be created or written to before the next scheduled update. In order to ensure that data integrity exposures do not occur, steps 158 and 160 are performed. In step 158, the metadata 43 is updated substantially immediately if the system 10 will run out of space on the disk 40 and the next scheduled update of the metadata 43 on the disk 40 has not occurred. In step 160 it is indicated that locations on the disk 40 which stored the removed file are available to store data substantially immediately if the system 10 will run out of space on the disk 40 and the next scheduled update of the metadata 43 on the disk 40 has not occurred. In one embodiment, step 160 includes updating the free space map 23 in the virtual storage 20 and hardening the changes in the free space map 23 to the disk 40. In a preferred embodiment, steps 158 and 160 are performed together. In a preferred embodiment, both the changes in the metadata 43 and the changes to the free space map 23 are hardened to the disk 40 together. Thus, in a preferred embodiment, either the changes to the metadata 43 and the changes to the free space map 23 are both hardened to the disk 40 together or neither of the changes are hardened to the disk 40.

Because the metadata 43 is not always updated immediately in the methods 100 and 150, performance of the system 10 is not substantially slowed. However, the metadata is updated substantially immediately and the locations marked as free substantially immediately if the system 10 would otherwise run out of space on the storage device 40 and the next scheduled update has not occurred. This ensures that the locations which stored the removed file can be used if necessary and avoids data integrity exposures.

The methods 100 and 150 provide an even greater performance enhancement when used to remove multiple files. If the methods 100 and 150 are used for multiple files, then each step in the methods 100 and 150, respectively, are carried out for multiple files, rather than a single file. The changes in the metadata 43 for all of the removed files is deferred unless the system 10 is to run out of space prior to the next scheduled update. Consequently, multiple disk accesses may be avoided. In a preferred embodiment, the changes to the metadata 43, the disk 40, and the virtual storage 20 are made at substantially the same time for all the removed files. Thus, the number of disk accesses are further reduced. For example, in a preferred embodiment, a directory 41 that contained entries 42 for the removed files will be rewritten once without all of entries for the removed files, rather than being rewritten once for every removed file. Similarly, the virtual storage 20 will preferably be updated once to include the locations on the disk 41 freed by deletion of all of the removed files.

Figure 6A:
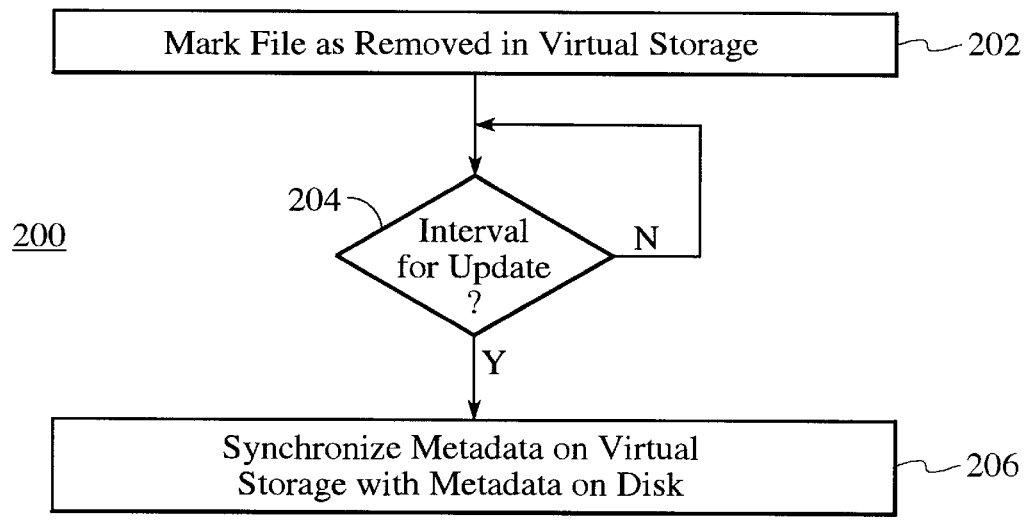
FIG. 6A is a more detailed flow chart depicting one embodiment of a method for removing files in accordance with the present invention for a preferred operating system.
Figure 6B:
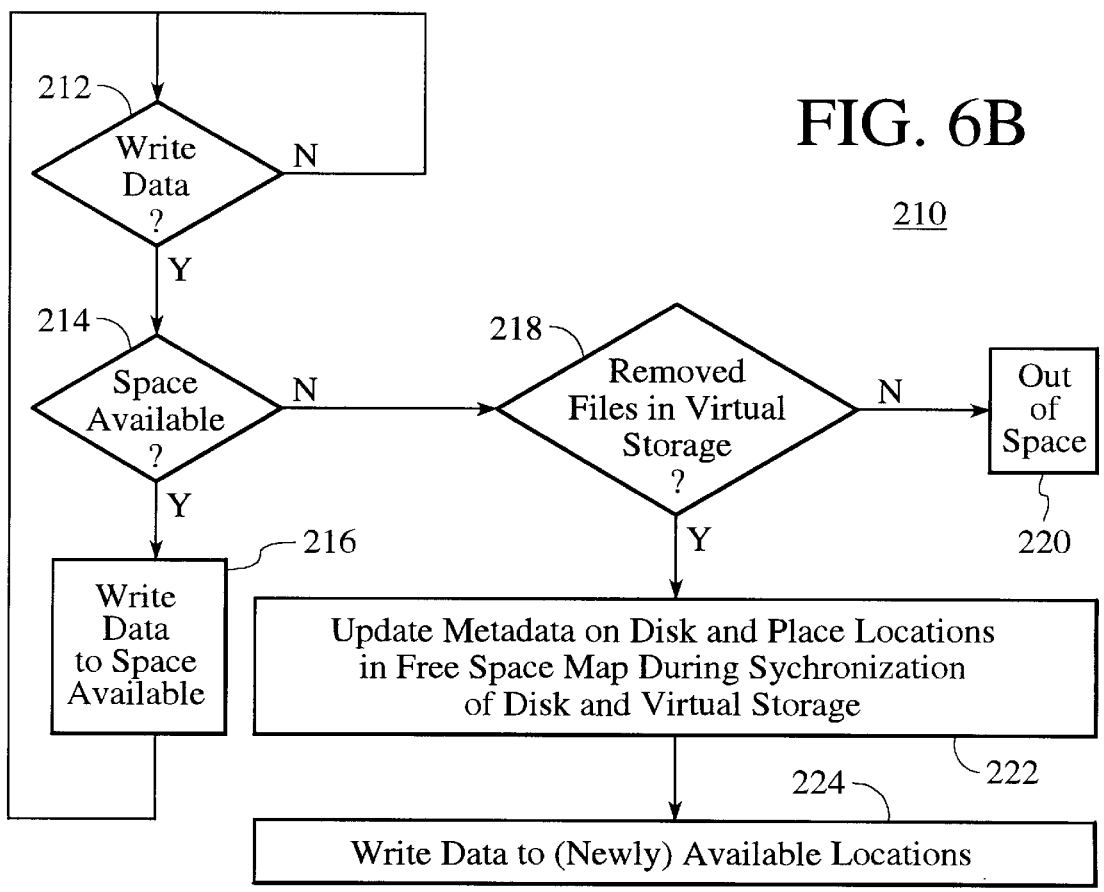
FIG. 6B is a more detailed flow chart depicting one embodiment of a method for writing files in accordance with the present invention for a preferred operating system.

FIGS. 6A and 6B depict embodiments of methods 200 and 210, respectively, which may be performed concurrently on a system utilizing a preferred operating system, UNIX. FIG. 6A depicts a method 200 for removing a file or files. FIG. 6B depicts a method for writing a file to the disk 40. In the preferred embodiment, the system 10 utilizes the virtual storage 20 in order to execute multiple tasks. Also in a preferred embodiment, the free space map 23 indicates the locations, such as blocks in the disk 40, which are available to store data. Note that the methods 200 and 210 depicted in FIGS. 6A and 6B may be performed in a multi-tasking environment. Consequently, the tasks which remove or write files, invoking the methods 200 or 210, may be unrelated.

Referring now to FIG. 6A, the method 200 commences after the system 10 has received a command to remove one or more files. The file or files to be deleted are marked as removed in virtual storage 20, via step 202. Data for the file may be removed from the virtual storage 20, metadata 43 for the file updated, and the file listed in the virtual storage 20 as if the file has been removed. However, step 202 does not place the locations of the removed file or files to the free space map 23. Hardening of the changes in the metadata 43 to the disk 40 are also not performed by step 202. Thus, hardening of changes in the metadata 43 to the disk 40 is deferred.

It is then determined whether the next scheduled update is to occur, via step 204. In a preferred embodiment, regularly scheduled updates are performed by a sync daemon (not shown) which runs at particular intervals. The sync daemon synchronizes the disk 40 with the virtual storage 20. If the next scheduled update is to occur, then the sync daemon runs, via step 206. Therefore, the sync daemon hardens the changes in the metadata 43 to the disk 40. In addition, the sync daemon rewrites the directory or directories 41 to account for the removed file or files. The sync daemon also places the locations freed by removal of the file or files into the free space map 23.

Although the changes to the metadata 43 are preferably deferred until the next scheduled update, files can be created, edited, or stored before the sync daemon is scheduled to run. Thus, the method 210 depicted in FIG. 6B may also be performed. It is determined whether data is to be written to the disk 40, via step 212. If not, then step 212 is returned to. If data is to be written to the disk 40, then it is determined if there is sufficient space on the disk 40 to write the data, via step 214. If there is sufficient space, then the data is written to the space already available, via step 216. The method then returns to determining if data is to be written to the disk 40 in step 212. As a result, when there is sufficient space already available, then hardening the changes in the metadata 43 to the disk 43 will be deferred until the next scheduled update. Thus, the method 200 will be performed.

If there is insufficient space, then it is determined if there are any files which have been marked as removed, but have not had changes in the metadata 43 hardened to the disk 40 yet, via step 218. If there are no such files, then the system 10 is out of space and an out of space message is provided, via step 220. If, however, there are such files, then the changes to the metadata 43 are hardened substantially immediately and the locations of the removed files placed in the free space map 23 substantially immediately, via step 222. The directories in which the removed files resided are also rewritten substantially immediately in step 222. In a preferred embodiment, step 222 performs its functions for all files which have been removed, but which have not had changes to the metadata 43 hardened. However, nothing prevents the method 210 from performing step 222 for a smaller number of files. Once the locations for the removed files are placed in the free space map 23, data is written to the locations in the free space map, via step 224. Thus, if the system 10 is to run out of space, then the hardening of changes to the metadata 43 is not deferred. Performance is enhanced without suffering data integrity exposures. In addition, the system 10 will meet one of the criteria for UNIX compliance: locations, or pages, from removed files are immediately available for reallocation, or use by other files.

Figure 7A:
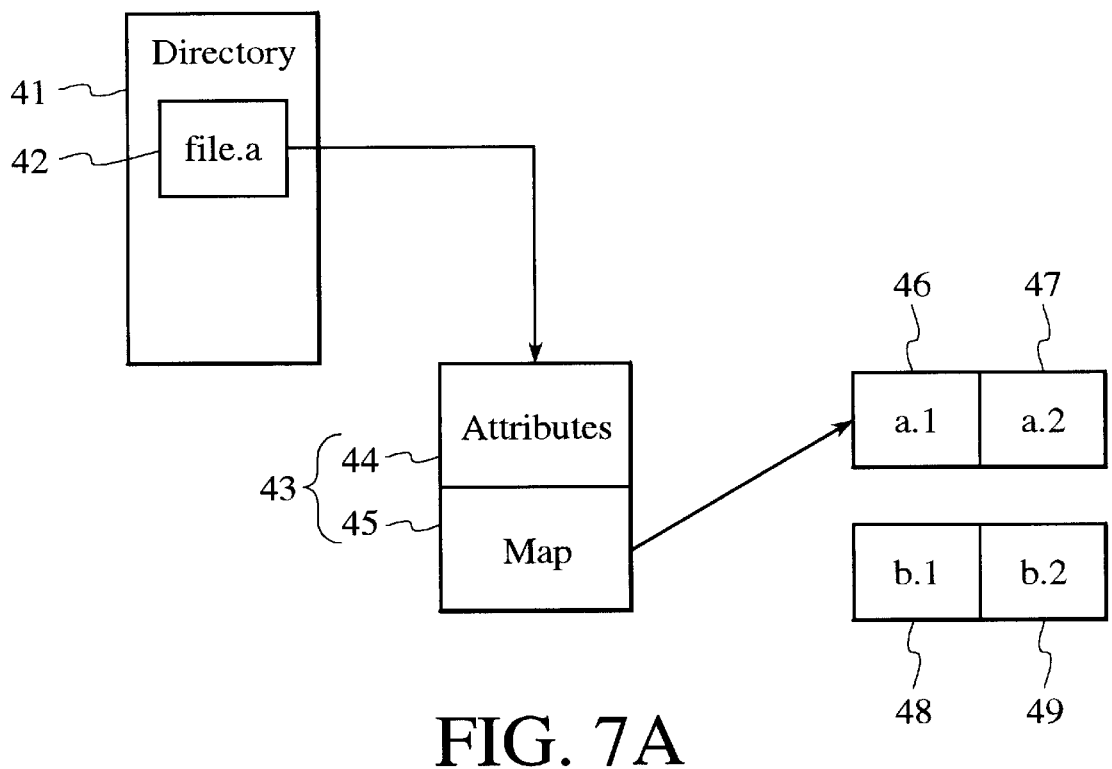
FIG. 7A is a block diagram of the relationship between a directory, metadata, and a storage device when the storage device does not reach an out of space condition during writing of a file.
Figure 7B:
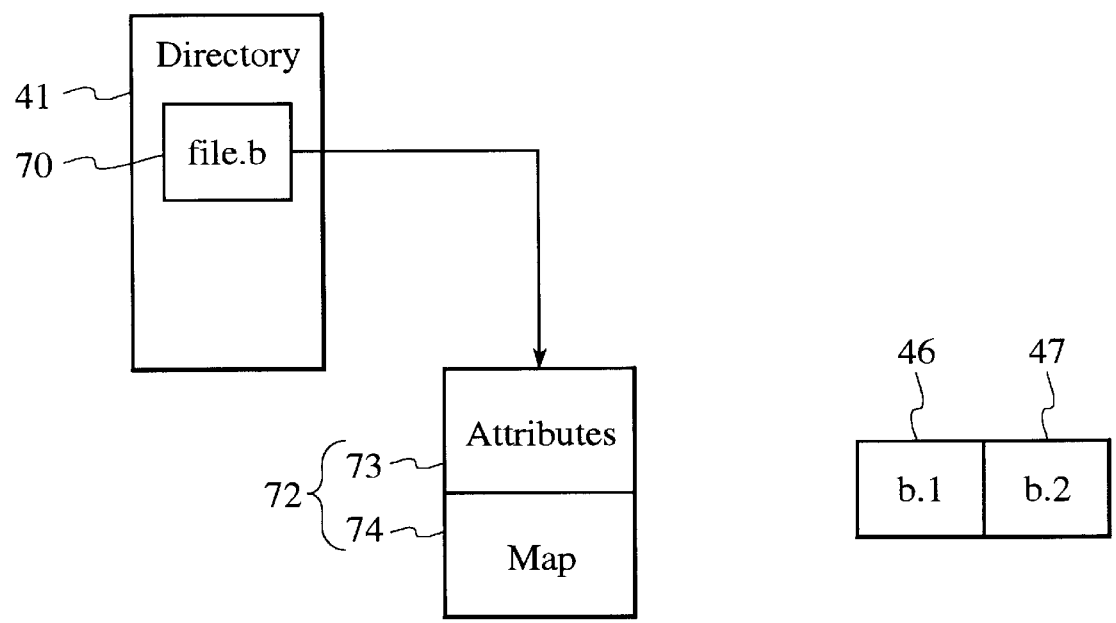
FIG. 7B is a block diagram of the relationship between a directory, metadata, and a storage device when the storage device does reach an out of space condition during writing of a file.

FIGS. 7A and 7B are block diagrams of the relationship between the directory 41, the metadata 43, and the disk 40 after a file, file.a, is removed via the method 100, 150, or 200 and the file, file.b, is written via the method 210. FIGS. 7A and 7B depict this relationship just after the file.b is written.

FIG. 7A demonstrates this relationship when there is sufficient space to write the data in the method 210. FIG. 7A also depicts this relationship before the next scheduled update of the metadata 43. Because sufficient space was available, changes to the metadata 43 for the removed file were not hardened to the disk 40 substantially immediately. Consequently, the directory 41 still has an entry 42 for the removed file.a which points to the metadata 43 including the attributes 44 and map 45 for the file.a. In addition, the map 45 still points to the locations 46 and 47 which store the data for the file.a. The data for the new file.b was written to locations 48 and 49 which were in the free space map 23. The changes to the metadata 43 and the metadata (not shown) for the new file.b will be hardened to the disk 40 on the next scheduled update.

If the system 10 crashes before the next scheduled hardening of the changes in the metadata 43 to the disk 40, there is no data integrity exposure. The removed file.a may reappear because the system 10 crashed. However, the data for file.b may not be accessed through the file.a because the file.b was written to locations 48 and 49 which were already free. Thus, data integrity exposures are substantially eliminated. In addition, because changes in the metadata 43 are not immediately hardened to disk for each file removal, system 10 performance does not suffer due to a large number of disk accesses.

FIG. 7B is a block diagram of the relationship between a directory, metadata, and a storage device when it is determined in step 214 that there is not sufficient space to write the data. FIG. 7B also depicts this relationship before the next scheduled update of the metadata 43. Because insufficient space was available, changes to the metadata 43 for the removed file were hardened to the disk 40 even though the next scheduled update of the metadata 43 had not occurred. Thus, the changes to the metadata 43 were hardened to disk before the file.b was written. Consequently, the directory 41 no longer has an entry for the removed file.a. There is also no metadata for the file.a. Instead, the directory 41 has an entry 70 for the file.b. The entry 70 points to the metadata 72 including the attributes 73 and a map 74 for the file.b. Once the changes to metadata 43 were hardened and the locations 46 and 47 placed in the free space map 23, the data for the new file.b was written to locations 46 and 47.

If the system 10 crashes before the scheduled update of the metadata 43, there is no data integrity exposure. This is because the method 210 hardened the changes in the metadata 43 to the disk 40 prior to writing data for the file.b in locations 46 and 47. Thus, the removed file.a does not reappear even if the system 10 crashes. Data integrity exposures are substantially eliminated.

In a preferred embodiment, the map 74 for the file.b does not yet point to the locations 46 and 47. This is because in a UNIX compliant system 10, data is written to the disk 40 prior to the map 74 being updated. The method 210 updates metadata in step 222 prior to writing data in 224. Thus, the map 74 does not yet point to the locations 46 and 47 because data was not written to the locations 46 and 47 prior to hardening the metadata 72 to the disk. Upon the next scheduled update, the map 74 will be updated to point to the locations 46 and 47 in which data for the file.b has been written.

Thus, the present invention defers updates of metadata for removed files until either the next scheduled update, for example using a sync daemon, or until the locations where the removed files were stored are needed by the system. Because the metadata is updated when the locations are required, data integrity exposures may be avoided. The present invention may also be compliant with a UNIX operating system. Additional disk accesses may also be reduced, improving performance. The performance improvement is even greater when multiple files are removed. This is because removal of multiple files may require multiple disk accesses for each file removed, while the present invention may use only a few disk accesses to update the metadata for all files removed. Moreover, since most systems are run such that the system does not run out of space on the disk, normally the metadata is hardened to the disk on the next scheduled update. Thus, the additional disk accesses, which are relatively slow, are likely to be avoided.

A method and system has been disclosed for removing files without data integrity exposures and a reduced degradation of performance. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for removing a file from a system, the system including a storage device and a virtual storage, the file having associated metadata indicating a location of the file on the storage device, a first copy of the associated metadata residing on the virtual storage, a second copy of the associated metadata residing on the storage device, the method comprising the steps of:

(a) marking the file as removed;

(b) updating the second copy of the metadata substantially immediately if the system is to run out of space on the storage device and a next scheduled update of the second copy of the associated metadata has not occurred; and (c) indicating that the location is available for storing data substantially immediately if the system is to run out of space on the storage device and the next scheduled update has not occurred.

2. The method of claim 1 further comprising the steps of:
   (d) updating the second copy of the associated metadata during the next scheduled update if the system is not to run out of space before the next scheduled update; and
   (e) indicating that the location is available for storing data during the next scheduled update if the system is not to run out of space before the next scheduled update.

3. The method of claim 2 wherein the virtual storage further includes a free space map, and wherein the step (c) of indicating that the location is available for storing data substantially immediately further includes the step of:
   (c1) adding the location to the free space map.

4. The method of claim 3 wherein the associated metadata further includes a map and wherein the step (b) of updating the second copy of the associated metadata substantially immediately further includes the step of:
   (b2) removing the map.

5. The method of claim 2 wherein the virtual storage further includes a free space map, and wherein the step (e) of indicating that the location is available for storing data during the next scheduled update further includes the step of:
   (e1) adding the location to the free space map.

6. The method of claim 5 wherein the associated metadata further includes a map and wherein the step (d) of updating the second copy of the metadata during the next scheduled update further includes the step of:
   (d2) removing the map.

7. The method of claim 2 wherein the file further includes a file name in a directory, and wherein the marking step (a) further comprises the steps of:
   (a1) rewriting a directory without the file name.

8. The method of claim 2 wherein the system further utilizes a UNIX operating system.

9. The method of claim 2 wherein the step (b) of updating the second copy of the associated metadata substantially immediately further includes the step of:
   (b1) updating the second copy of the associated metadata during a synchronization of the virtual storage and the storage device.

10. The method of claim 9 wherein the step (d) of updating the second copy of the metadata during the next scheduled update further includes the step of:
    (d1) updating the second copy of the associated metadata during a next scheduled synchronization of the virtual storage and the storage device.

11. A computer-readable medium containing a program for removing a file from a system, the system including a storage device and a virtual storage, the file having associated metadata indicating a location of the file on the storage device, a first copy of the associated metadata residing on the virtual storage, a second copy of the associated metadata residing on the storage device, the program comprising instructions for:
    (a) marking the file as removed;
    (b) updating the second copy of the associated metadata substantially immediately if the system is to run out of space on the storage device and a next scheduled update of the second copy of the associated metadata has not occurred; and
    (c) indicating that the location is available for storing data substantially immediately if the system is to run out of space on the storage device and the next scheduled update has not occurred.

12. A computer-readable medium containing a program for removing a file from a system, the system including a storage device and a virtual storage having a free space map, the file having a file name and associated metadata, the associated metadata including a map indicating a location of the file on the storage device, a first copy of the associated metadata residing in the virtual storage, and a second copy of the associated metadata residing on the storage device, the file name residing in a directory, the program comprising instructions for:
    (a) marking the file as removed by rewriting a directory without the file name;
    (b) removing the map for the second copy of the associated metadata substantially immediately if the system is to run out of space on the storage device and a next scheduled update of the second copy of the associated metadata has not occurred;
    (c) adding the location to the free space map substantially immediately if the system is to run out of space on the storage device and the next scheduled update has not occurred;
    (d) removing the map for the second copy of the associated metadata during the next scheduled update if the system is not to run out of space before the next scheduled update; and
    (e) adding the location to the free space map during the next scheduled update if the system is not to run out of space before the next scheduled update.

13. A system for storing and removing a file having associated metadata, the system comprising:
    a virtual storage including a first copy of the associated metadata;
    a storage device coupled with the virtual storage, the storage device including a location of the file, the associated metadata indicating the location of the file, a second copy of the associated metadata residing on the storage device;
    means coupled with the virtual storage and the storage device for removing the file, the file removing means including
    means for marking the file as removed;
    means coupled with the marking means for updating the second copy of the associated metadata; and
    means coupled with the updating means for indicating that the location is available for storing data;
    wherein the updating means update the second copy of the associated metadata substantially immediately if the system is to run out of space on the storage device and a next scheduled update of the second copy of the associated metadata has not occurred; and
    wherein the indicating means indicate that the location is available for storing data substantially immediately if the system is to run out of space on the storage device and the next scheduled update has not occurred.

14. The system of claim 13 wherein:
    the updating means update the second copy of the associated metadata during the next scheduled update if the system is not to run out of space before the next scheduled update; and
    the indicating means indicate that the location is available for storing data during the next scheduled update if the system is not to run out of space before the next scheduled update.

15. The system of claim 14 wherein the virtual storage includes a free space map and wherein:
    the indicating means add the location to the free space map substantially immediately if the system is to run out of space on the storage device and the next scheduled update has not occurred; and the indicating means add the location to the free space map during the next scheduled update if the system is not to run out of space before the next scheduled update.

16. The system of claim 15 wherein the associated metadata further includes a map and wherein:

the updating means remove the map for the second copy of the associated metadata substantially immediately if the system is to run out of space on the storage device and the next scheduled update has not occurred; and the updating means remove the map for the second copy of the associated metadata during the next scheduled update if the system is not to run out of space before the next scheduled update.

17. The system of claim 13 wherein the updating means further update the second copy of the associated metadata during a synchronization of the virtual storage and the storage device.

18. The system of claim 13 wherein the file further includes a file name in a directory, and wherein the marking means further comprises:

means for rewriting a directory without the file name.

19. The system of claim 13 wherein the system further utilizes a UNIX operating system.

* * * * *